US008909381B2

(12) United States Patent
Crist

(10) Patent No.: US 8,909,381 B2
(45) Date of Patent: *Dec. 9, 2014

(54) DATA COMMUNICATION IN A MULTI-WIRE IRRIGATION CONTROL SYSTEM

(71) Applicant: Rain Bird Corporation, Azusa, CA (US)

(72) Inventor: Timothy J. Crist, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,966

(22) Filed: Aug. 9, 2013

(65) Prior Publication Data

US 2014/0039698 A1   Feb. 6, 2014

Related U.S. Application Data

(63) Continuation of application No. 13/570,139, filed on Aug. 8, 2012, now Pat. No. 8,532,831, which is a continuation of application No. 12/505,401, filed on Jul. 17, 2009, now Pat. No. 8,260,465.

(51) Int. Cl.
| | |
|---|---|
| *G05D 11/00* | (2006.01) |
| *H03L 5/00* | (2006.01) |
| *G08C 19/16* | (2006.01) |
| *H03K 7/00* | (2006.01) |
| *H03K 7/02* | (2006.01) |
| *H03C 1/00* | (2006.01) |
| *H03C 5/00* | (2006.01) |
| *H03C 1/52* | (2006.01) |
| *H04L 27/02* | (2006.01) |
| *H04L 27/04* | (2006.01) |
| *A01G 25/16* | (2006.01) |

(52) U.S. Cl.
CPC .................................... *A01G 25/16* (2013.01)
USPC ...... 700/284; 327/306; 340/870.18; 332/106; 332/115; 332/149; 332/155; 375/268; 375/300

(58) Field of Classification Search
CPC ...... H04B 14/004; H04L 27/02; H04L 27/34; H04L 27/00; H03C 1/00
USPC ...................... 700/284; 327/306; 340/870.18; 332/106, 115, 149, 155; 375/268, 300
See application file for complete search history.

(56) References Cited

U.S. PATENT DOCUMENTS

| | | | |
|---|---|---|---|
| 3,547,154 | A | 12/1970 | Benham |
| 3,729,710 | A | 4/1973 | Sherwin |

(Continued)

FOREIGN PATENT DOCUMENTS

| | | |
|---|---|---|
| CN | 1345531 | 4/2002 |
| CN | 1511383 | 7/2004 |

(Continued)

OTHER PUBLICATIONS

EPO; App. No. Ep10170920.2; European Search Report mailed Mar. 8, 2012.

(Continued)

*Primary Examiner* — Ronald Hartman, Jr.
(74) *Attorney, Agent, or Firm* — Fitch, Even, Tabin & Flannery, LLP

(57) ABSTRACT

An irrigation control device having a modulator that modulates data onto an alternating power signal by distorting amplitude of a first leading portion of selected cycles of the alternating power signal, and permit effectively a full amplitude of the alternating power signal on a following portion of the selected cycles, wherein the first leading portion and the following portion are either both on a high side of a cycle or both on a low side of a cycle of the alternating power signal.

The irrigation control device further includes an interface configured to couple the modulator to a multi-wire interface coupled to a plurality of irrigation devices to permit the alternating power signal to be applied to the multi-wire interface.

20 Claims, 8 Drawing Sheets

(56) References Cited

U.S. PATENT DOCUMENTS

| | | | |
|---|---|---|---|
| 3,747,620 A | 7/1973 | Kah | |
| 3,941,348 A | 3/1976 | Mott | |
| 3,989,066 A | 11/1976 | Sturman | |
| 4,007,458 A | 2/1977 | Hollabaugh | |
| 4,022,244 A | 5/1977 | Oman | |
| D246,377 S | 11/1977 | Pansini | |
| 4,065,722 A * | 12/1977 | Francis | 329/300 |
| 4,121,114 A | 10/1978 | Ruggles | |
| 4,131,882 A | 12/1978 | Hollabaugh | |
| 4,165,532 A | 8/1979 | Kendall | |
| 4,176,395 A | 11/1979 | Evelyn-Veere | |
| 4,241,375 A | 12/1980 | Ruggles | |
| 4,423,484 A | 12/1983 | Hamilton | |
| 4,535,401 A | 8/1985 | Penn | |
| 4,548,225 A | 10/1985 | Busalacchi | |
| 4,556,864 A * | 12/1985 | Roy | 375/219 |
| 4,562,506 A | 12/1985 | Moran | |
| 4,596,266 A | 6/1986 | Kinghorn | |
| 4,645,882 A | 2/1987 | Nakayama | |
| 4,716,490 A | 12/1987 | Alexanian | |
| 4,718,454 A | 1/1988 | Appleby | |
| D294,964 S | 3/1988 | Mendenhall | |
| D297,929 S | 10/1988 | Hughes | |
| 4,777,556 A | 10/1988 | Imran | |
| 4,811,221 A | 3/1989 | Sturman | |
| 5,008,664 A * | 4/1991 | More et al. | 340/854.8 |
| 5,021,939 A | 6/1991 | Pulgiese | |
| 5,048,755 A | 9/1991 | Dodds | |
| 5,079,667 A | 1/1992 | Kasano | |
| 5,100,056 A | 3/1992 | Theodorsen | |
| 5,229,649 A | 7/1993 | Nielsen | |
| 5,251,153 A | 10/1993 | Nielsen | |
| 5,333,785 A | 8/1994 | Dodds | |
| 5,347,421 A | 9/1994 | Alexanian | |
| 5,402,303 A | 3/1995 | Luck | |
| D361,057 S | 8/1995 | Fayfield | |
| 5,485,400 A | 1/1996 | Warrior | |
| 5,638,847 A | 6/1997 | Hoch | |
| 5,649,818 A | 7/1997 | Day | |
| 5,655,561 A | 8/1997 | Wendel | |
| 5,661,349 A | 8/1997 | Luck | |
| 5,740,031 A | 4/1998 | Gagnon | |
| 5,760,706 A | 6/1998 | Kiss | |
| 5,780,938 A | 7/1998 | Edwards | |
| 5,825,664 A | 10/1998 | Warrior | |
| 5,826,619 A | 10/1998 | Roman | |
| 5,839,658 A | 11/1998 | Sarver | |
| 5,848,609 A | 12/1998 | Marchesseault | |
| 5,914,847 A | 6/1999 | Alexanian | |
| 5,938,172 A | 8/1999 | Ohtsuka | |
| 6,021,038 A | 2/2000 | Hanchett | |
| 6,126,141 A | 10/2000 | Geiger | |
| 6,154,354 A | 11/2000 | Alexanian | |
| 6,283,139 B1 | 9/2001 | Symonds | |
| 6,335,855 B1 | 1/2002 | Alexanian | |
| 6,337,635 B1 | 1/2002 | Ericksen | |
| 6,351,366 B1 | 2/2002 | Alexanian | |
| 6,378,838 B1 | 4/2002 | Brundisini | |
| 6,460,563 B2 | 10/2002 | Olson | |
| D470,823 S | 2/2003 | Ufer | |
| D477,287 S | 7/2003 | Roman | |
| 6,652,188 B1 | 11/2003 | Albright | |
| 6,694,223 B1 | 2/2004 | Goldberg | |
| 6,721,630 B1 | 4/2004 | Woytowitz | |
| 6,763,287 B2 | 7/2004 | Brundisini | |
| 6,766,221 B1 | 7/2004 | Christiansen | |
| 6,782,310 B2 | 8/2004 | Bailey | |
| 6,782,311 B2 | 8/2004 | Barlow | |
| 6,783,287 B2 | 8/2004 | Kudo | |
| 6,812,826 B2 | 11/2004 | Buhler | |
| 6,842,667 B2 | 1/2005 | Beutler | |
| 6,898,467 B1 | 5/2005 | Smith | |
| 6,948,697 B2 | 9/2005 | Herbert | |
| 6,971,684 B2 | 12/2005 | Ferrari | |
| 6,993,416 B2 | 1/2006 | Christiansen | |
| 7,058,479 B2 | 6/2006 | Miller | |
| 7,069,115 B1 | 6/2006 | Woytowitz | |
| 7,084,741 B2 | 8/2006 | Plummer | |
| 7,123,993 B1 | 10/2006 | Freeman | |
| 7,146,225 B2 | 12/2006 | Guenst | |
| 7,146,255 B2 | 12/2006 | Christiansen | |
| 7,181,319 B1 | 2/2007 | Woytowtiz | |
| 7,182,272 B1 | 2/2007 | Marian | |
| 7,206,669 B2 | 4/2007 | Christiansen | |
| D542,682 S | 5/2007 | Waki | |
| 7,245,991 B1 | 7/2007 | Woytowitz | |
| 7,248,945 B2 | 7/2007 | Woytowitz | |
| 7,257,465 B2 | 8/2007 | Perez | |
| 7,273,206 B2 | 9/2007 | Sato | |
| 7,286,904 B2 | 10/2007 | Graham | |
| 7,289,862 B2 | 10/2007 | Britton | |
| 7,358,626 B2 | 4/2008 | Gardner | |
| 7,359,769 B2 | 4/2008 | Bailey | |
| 7,383,721 B2 | 6/2008 | Parsons | |
| 7,398,139 B1 | 7/2008 | Woytowitz | |
| 7,403,840 B2 | 7/2008 | Moore | |
| 7,406,363 B2 | 7/2008 | Doering | |
| 7,421,317 B2 | 9/2008 | Christiansen | |
| 7,444,207 B2 | 10/2008 | Nickerson | |
| 7,458,521 B2 | 12/2008 | Ivans | |
| 7,474,024 B2 | 1/2009 | Nakanishi | |
| 7,526,365 B1 | 4/2009 | Frerich | |
| 7,574,285 B2 | 8/2009 | Kah | |
| 7,613,547 B1 | 11/2009 | Woytowitz | |
| 7,640,079 B2 | 12/2009 | Nickerson | |
| D611,001 S | 3/2010 | Ihde | |
| D622,226 S | 8/2010 | Crist | |
| 7,772,726 B1 | 8/2010 | Porter | |
| 7,792,612 B2 | 9/2010 | Kah | |
| 7,826,931 B2 | 11/2010 | Lorenz | |
| 7,883,027 B2 | 2/2011 | Fekete | |
| 7,899,581 B1 | 3/2011 | Woytowitz | |
| 7,930,069 B2 | 4/2011 | Savelle | |
| 7,953,517 B1 | 5/2011 | Porter | |
| 8,019,482 B2 | 9/2011 | Sutardja | |
| 8,024,075 B2 | 9/2011 | Fekete | |
| 8,104,993 B2 | 1/2012 | Hitt | |
| 8,108,078 B2 | 1/2012 | Lorenz | |
| 8,160,750 B2 | 4/2012 | Weiler | |
| 8,170,721 B2 | 5/2012 | Nickerson | |
| 8,193,930 B2 | 6/2012 | Petite | |
| 8,200,368 B2 | 6/2012 | Nickerson | |
| 8,224,493 B2 | 7/2012 | Walker | |
| 8,260,465 B2 | 9/2012 | Crist | |
| 8,274,171 B2 | 9/2012 | Korol | |
| 8,295,985 B2 | 10/2012 | Crist | |
| 8,532,831 B2 | 9/2013 | Crist | |
| 8,659,183 B2 | 2/2014 | Crist | |
| 2002/0035414 A1 | 3/2002 | Morikawa | |
| 2002/0053970 A1 | 5/2002 | Plummer | |
| 2002/0071234 A1 | 6/2002 | Alexanian | |
| 2002/0085333 A1 | 7/2002 | Alexanian | |
| 2002/0088875 A1 | 7/2002 | Sirkin | |
| 2002/0091452 A1 | 7/2002 | Addink | |
| 2002/0166986 A1 | 11/2002 | Remby | |
| 2003/0006882 A1 | 1/2003 | Buhler | |
| 2003/0120393 A1 | 6/2003 | Bailey | |
| 2003/0135286 A1 | 7/2003 | Brundisini | |
| 2003/0179102 A1 | 9/2003 | Barnes | |
| 2003/0201675 A1 | 10/2003 | Alexanian | |
| 2004/0039489 A1 | 2/2004 | Moore | |
| 2004/0046137 A1 | 3/2004 | Herbert | |
| 2004/0086053 A1 | 5/2004 | Anderson | |
| 2004/0225412 A1 | 11/2004 | Alexanian | |
| 2005/0004715 A1 | 1/2005 | Christiansen | |
| 2005/0038529 A1 | 2/2005 | Perez | |
| 2005/0055106 A1 | 3/2005 | Beutler | |
| 2005/0087620 A1 | 4/2005 | Bowers | |
| 2005/0156067 A1 | 7/2005 | Ivans | |
| 2005/0156068 A1 | 7/2005 | Ivans | |
| 2005/0264973 A1 | 12/2005 | Gardner | |
| 2006/0043208 A1 | 3/2006 | Graham | |
| 2006/0080003 A1 | 4/2006 | Christiansen | |
| 2006/0091245 A1 | 5/2006 | Ivans | |

(56) References Cited

U.S. PATENT DOCUMENTS

| | | |
|---|---|---|
| 2006/0116793 A1 | 6/2006 | Christiansen |
| 2006/0206239 A1 | 9/2006 | Christiansen |
| 2007/0035907 A1 | 2/2007 | Doering |
| 2007/0061048 A1 | 3/2007 | Lorenz |
| 2007/0106426 A1 | 5/2007 | Ensworth |
| 2007/0179674 A1 | 8/2007 | Ensworth |
| 2007/0221750 A1 | 9/2007 | Roberts |
| 2007/0282486 A1 | 12/2007 | Walker |
| 2008/0027587 A1 | 1/2008 | Nickerson |
| 2008/0039978 A1 | 2/2008 | Graham |
| 2008/0058995 A1 | 3/2008 | Holindrake |
| 2008/0157995 A1 | 7/2008 | Crist |
| 2008/0211307 A1 | 9/2008 | Gardner |
| 2008/0275595 A1 | 11/2008 | Bailey |
| 2008/0288117 A1 | 11/2008 | Nickerson |
| 2008/0319585 A1 | 12/2008 | Nickerson |
| 2009/0076659 A1 | 3/2009 | Ensworth |
| 2009/0076660 A1 | 3/2009 | Goldberg |
| 2009/0120521 A1 | 5/2009 | Clark |
| 2009/0138131 A1 | 5/2009 | Uy |
| 2009/0150001 A1 | 6/2009 | Fekete |
| 2009/0150002 A1 | 6/2009 | Fekete |
| 2009/0222140 A1 | 9/2009 | Christiansen |
| 2009/0292401 A1 | 11/2009 | Kah |
| 2010/0004789 A1 | 1/2010 | Savelle |
| 2010/0030476 A1 | 2/2010 | Woytowitz |
| 2010/0082169 A1 | 4/2010 | Crist |
| 2010/0094472 A1 | 4/2010 | Woytowitz |
| 2010/0100247 A1 | 4/2010 | Nickerson |
| 2010/0131119 A1 | 5/2010 | Brundisini |
| 2010/0145531 A1 | 6/2010 | Nickerson |
| 2010/0268392 A1 | 10/2010 | Korol |
| 2011/0015793 A1 | 1/2011 | Crist |
| 2011/0015794 A1 | 1/2011 | Lorenz |
| 2011/0017845 A1 | 1/2011 | Crist |
| 2011/0035064 A1 | 2/2011 | Kah |
| 2011/0040415 A1 | 2/2011 | Nickerson |
| 2011/0040416 A1 | 2/2011 | Nickerson |
| 2011/0077785 A1 | 3/2011 | Nickerson |
| 2011/0190947 A1 | 8/2011 | Savelle |
| 2011/0190948 A1 | 8/2011 | Fekete |
| 2011/0224836 A1 | 9/2011 | Hem |
| 2012/0085950 A1 | 4/2012 | Lorenz |
| 2012/0089259 A1 | 4/2012 | Williams |
| 2012/0203383 A1 | 8/2012 | Holindrake |
| 2012/0303169 A1 | 11/2012 | Crist |
| 2013/0002012 A1 | 1/2013 | Korol |

FOREIGN PATENT DOCUMENTS

| | | |
|---|---|---|
| EP | 0748584 A1 | 12/1996 |
| EP | 1324166 A2 | 7/2003 |
| EP | 1763990 A2 | 3/2007 |
| EP | 2281445 | 2/2011 |
| GB | 2177582 A | 1/1987 |
| WO | 8606579 A1 | 11/1986 |
| WO | 02058254 A1 | 7/2002 |
| WO | 2005002321 A2 | 1/2005 |
| WO | 2011017059 A2 | 2/2011 |

OTHER PUBLICATIONS

Michrochip Technology Inc.; PIC/16F631/677/685/687,689/690 Data Sheet; 20-Pin Flash-Based, 8-Bit CMOS Microcontollers with Nano Watt Technology; 2006; 294 pages.

PCT; App. No. PCT/US2010/043273; International Search Report mailed Mar. 2, 2011; 3 pages.

PCT; App. No. PCT/US2010/043273; Written Opinion of the International Searching Authority mailed Mar. 2, 2011; 3 pages.

Rain Bird, 'FD Field Decoders: Rain Bird Decoders', Feb. 17, 2005, pp. 1-4, printed from www.rainbird.com/golf/products/centralcontrol/decoders.htm, Rain Bird Corporation, Glendora, CA.

Rain Bird, 'Full/Part Circle Roters', Oct. 2004, pp. 1-4, Catalog No. 438, Rain Bird Corporation, Glendora, CA.

Rain Bird, 'Tech Specs: Rain Bird Decoders', Oct. 2004, Rain Bird Corporation Golf Division, Tucson, AZ. (2 pages).

Rain Bird, "Master Parts Book 2008-2009", Jan. 2008, pp. 129-130, 140, Rain Bird Corporation, Parts and Service Center, Azusa, CA.

Rain Bird, "Maxicom2 Decoders: Sensor-Pulse", Sep. 2002, pp. 1-2, Rain Bird Corporation, Azusa, CA.

Rain Bird, "Rain Bird Latching Solenoid: Part No. 231831", 1999, Rain Bird Corporation, Tucson, AZ.

Rain Bird, "Rain Bird MDC Decoder-based Control System", Jan. 2006, pp. 1-4, Rain Bird Corporation, Azusa, CA.

The Toro Company; 'Golf Decoder Control System (GDC)'; Jun. 25, 2007, pp. 1, printed from http://web.archive.org/web/20070625035525/www.toro.com/irrigation/golf/lgturffield/gdc/index.html, The Toro Company, Bloomington, MN.

U.S. Appl. No. 12/505,401; Notice of Allowance mailed May 7, 2012.

U.S. Appl. No. 12/505,401; Office Action mailed Oct. 31, 2011.

U.S. Appl. No. 13/570,139; Notice of Allowance mailed May 9, 2013.

U.S. Appl. No. 13/570,139; Office Action mailed Dec. 26, 2012.

* cited by examiner

DATA COMMUNICATION IN A MULTI-WIRE IRRIGATION CONTROL SYSTEM

This application is a continuation of U.S. application Ser. No. 13/570,139 filed Aug. 8, 2012, which is a continuation of U.S. application Ser. No. 12/505,401 filed Jul. 17, 2009, now U.S. Pat. No. 8,260,465, both of which are incorporated in their entirety herein by reference.

BACKGROUND OF THE INVENTION

1. Field of the Invention

The present invention relates generally to irrigation devices, and more particularly to the communication of data using an alternating power signal to be supplied to irrigation devices.

2. Discussion of the Related Art

Typical irrigation control systems cooperate with water valves and pumps to control the flow of irrigation water through a variety of water dispensing devices, including sprinklers, rotors, drip-lines, and other water delivery devices. These control systems are used in a wide variety of irrigation applications, from residential and commercial landscapes to golf course and agricultural irrigation.

Many irrigation systems and electronics are powered by 50/60 Hz AC voltage signals. Some systems further modulate this power source to provide data communication, for example, by selectively clipping the positive half of the AC voltage signal. Data and power sent in this manner are often over a two-wire transmission line and are often referred to as a two-wire interface. Irrigation devices variously located in the field couple to the two-wire interface and derive their operational power therefrom. The irrigation devices demodulate the data monitoring the received power signal for a missing negative half of a cycle, then taking eight voltage samples at a predetermined time thereafter during the positive half to detect whether the signal is clipped or unclipped. Such systems are well known in the art and described for example in U.S. Pat. No. 4,176,395 to Evelyn-Veere.

SUMMARY OF THE INVENTION

In one embodiment, the invention can be characterized as a method for providing power and data to an irrigation device. The method includes modulating data onto an alternating power signal by distorting an amplitude of a first leading portion of selected cycles of the alternating power signal, permitting effectively a full amplitude of the alternating power signal on a following portion of the selected cycles, wherein the first leading portion and the following portion are either both on a high side of a cycle or both on a low side of a cycle of the alternating power signal, and applying the alternating power signal to a multi-wire interface configured to couple with a plurality of irrigation devices.

In another embodiment, the invention can be characterized as a method for use in an irrigation system. The method includes receiving an alternating power signal comprising cycles each having a first leading portion and a following portion, wherein the first leading portion and the following portion are either both on a high side of a cycle or both on a low side of a cycle of the alternating power signal, and demodulating data represented by the alternating power signal based upon whether the first leading portion of a cycle of the alternating power signal has an amplitude that is distorted and where the following portion has an amplitude that is undistorted.

In yet another embodiment, the invention can be characterized as an irrigation control device having a modulator configured to modulate data onto an alternating power signal by distorting amplitude of a first leading portion of selected cycles of the alternating power signal, and permit effectively a full amplitude of the alternating power signal on a following portion of the selected cycles, wherein the first leading portion and the following portion are either both on a high side of a cycle or both on a low side of a cycle of the alternating power signal. The irrigation controller further includes an interface configured to couple the modulator to a multi-wire interface coupled to a plurality of irrigation devices to permit the alternating power signal to be applied to the multi-wire interface.

In still yet another embodiment, the invention can be characterized as an irrigation device having an input configured to receive an alternating power signal comprising cycles having a first leading portion and a following portion, wherein the first leading portion and the following portion are either both on a high side of a cycle or both on a low side of a cycle of the alternating power signal, and a demodulator configured to provide data by demodulating the alternating power signal based upon whether the first leading portion of a cycle of the alternating power signal has an amplitude that is distorted and where the following portion has an amplitude that is undistorted.

In a further embodiment, the invention may be characterized as a method for use in an irrigation system, the method comprising: receiving, at an irrigation device, an alternating power signal comprising cycles, where an amplitude of a portion of each cycle is selectively distorted to modulate data on the alternating power signal; determining a slope of the portion of each cycle; and demodulating the data based upon the determining the slope

BRIEF DESCRIPTION OF THE DRAWINGS

The above and other aspects, features and advantages of several embodiments of the present invention will be more apparent from the following more particular description thereof, presented in conjunction with the following drawings.

Figure 1:
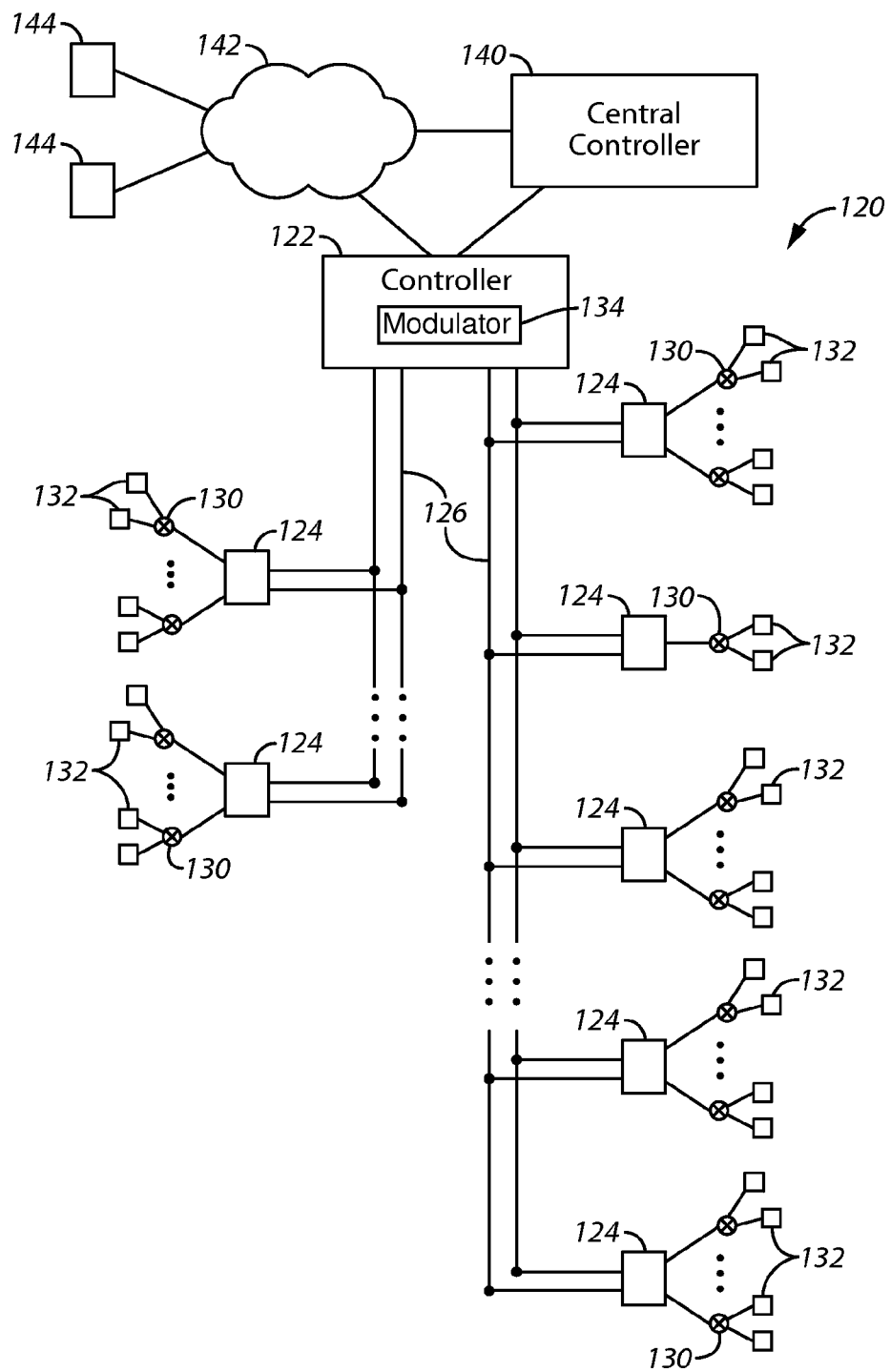
FIG. 1 depicts a simplified block diagram of an irrigation system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

FIG. 1 depicts a simplified block diagram of an irrigation system 120 according to some embodiments. The irrigation system includes an irrigation controller 122 (which may be generically referred to as an irrigation control device) and one or more remote irrigation devices 124 coupled with the irrigation controller through one or more multi-wire (e.g., two-wire) power lines, paths or interfaces 126. The irrigation devices 124 can each include a demodulator and are coupled with one or more valves and/or field stations 130 that cooperate with one or more sprinklers, rotors, drip-lines, and/or other water delivery devices 132 to supply water to the water delivery devices. In some implementations, the irrigation controller 122 is a satellite controller and further couples with a central irrigation controller 140 that provides at least some control over the irrigation controller. Typically, the central irrigation controller 140 couples with a plurality of irrigation controllers 122 and/or other such satellite irrigation controllers to coordinate the irrigation by the multiple irrigation controllers.

The irrigation controller 122 further includes a modulator 134 that allows the irrigation controller to modulate information onto an AC power signal, for example, by clipping one or more of the positive and/or negative peaks of the signals providing communication in addition to power to the one or more irrigation devices 124. Modulators are well known in the art and as such no further explanation of a modulator is provided. The irrigation devices coupled with the two-wire interface 126 draw operating power from the two-wire line and/or interface 126 as well as receive communications, such as irrigation instructions, parameters, conditions and the like that at least in part can be used in controlling and/or coordinating the implementation of irrigation and/or irrigation schedules.

Further, the irrigation controller 122 can optionally couple with one or more distributed networks 142, such as an intranet, the Internet or other such networks. It is understood that the network 142, however, can be substantially any relevant wired or wireless communication network, networks or combination of networks to communicate data, such as public switched telephone network (PSTN), cellular, paging, radio frequency broadcast, hybrid networks of one or more of fiber, cable and/or satellite, and other relevant networks, and that the irrigation controller can connect with the network through wired, wireless or a combination of wired and wireless connections. By coupling with the network the irrigation controller 122 can access other devices 144 on the network, such as servers, weather stations, databases and the like to receive and/or forward scheduling information, control information, weather information, evapotranspiration (ET) data, operating parameters, and/or other such relevant data and information.

In operation, the irrigation devices 124 receive input power signals from over the two-wired interface 126 and attempt to demodulate communications modulated onto the AC voltage input signal. In some implementations, the irrigation devices detect a synchronization pulse or other identifier and synchronize the timing and/or operation of the irrigation device based on the receipt of that synchronization. Additional data can be demodulated from the input signal. When multiple irrigation devices are active on a single two-wire interface, the power signal can include a device identifier (ID) that designates to which irrigation device or devices the communication is being directed. As such, an irrigation device can extract the device ID from the demodulated data and determine whether the communication is directed to the irrigation device. When the communication is directed to the irrigation device, the irrigation device can utilize the demodulated data and take appropriate action, such as activating or deactivating irrigation, implementing instructions or schedules, altering parameters and the like.

Figure 2:
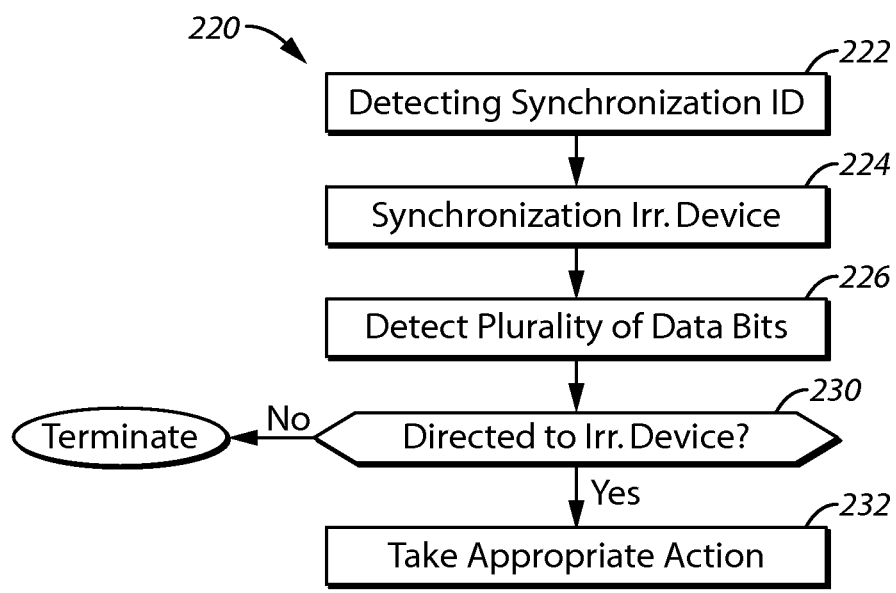
FIG. 2 depicts a simplified flow diagram of a process of receiving communications and/or controlling irrigation according to some embodiments.

FIG. 2 depicts a simplified flow diagram of a process 220 of receiving communications and/or controlling irrigation according to some embodiments. In step 222, a synchronization identifier is detected. The synchronization identifier typically is defined by a modulated pulse or series of pulses that can be distinguished from other modulation, such as a predefined pattern, attenuating or clipping a predefined portion of a pulse (e.g., clipping a negative side of a pulse), attenuating one or more pulses by a predefined amount or other such detectable modulation.

In step 224, the irrigation device is synchronized, for example, noting a relationship between the receipt of the synchronization and one or more internal clocks and/or timers, adjusting one or more internal clocks and/or times, and/or internal component operations and/or other such synchronizations. For example, in some embodiments synchronization provides a known starting point for the irrigation device and/or processes of the irrigation device, to restart clocks and prepare to receive data over the two-wire path. In step 226, a plurality of data pulses are detected and demodulated. These data pulses can include device ID, instructions, parameters and/or other such information as described above and further below. In step 230, it is determined whether the data being received over the two-wired interface are directed to the irrigation controller. When the communication is not directed to the irrigation controller the process 220 terminates and/or returns to step 222 to await a subsequent synchronization. Alternatively, step 232 is entered where the irrigation device 124 takes appropriate action, such as activating irrigation, interrupting and/or stopping irrigation, changing parameters, determining local parameters and transmitting a communication based on the determined parameters, and/or other such action.

Figure 3:
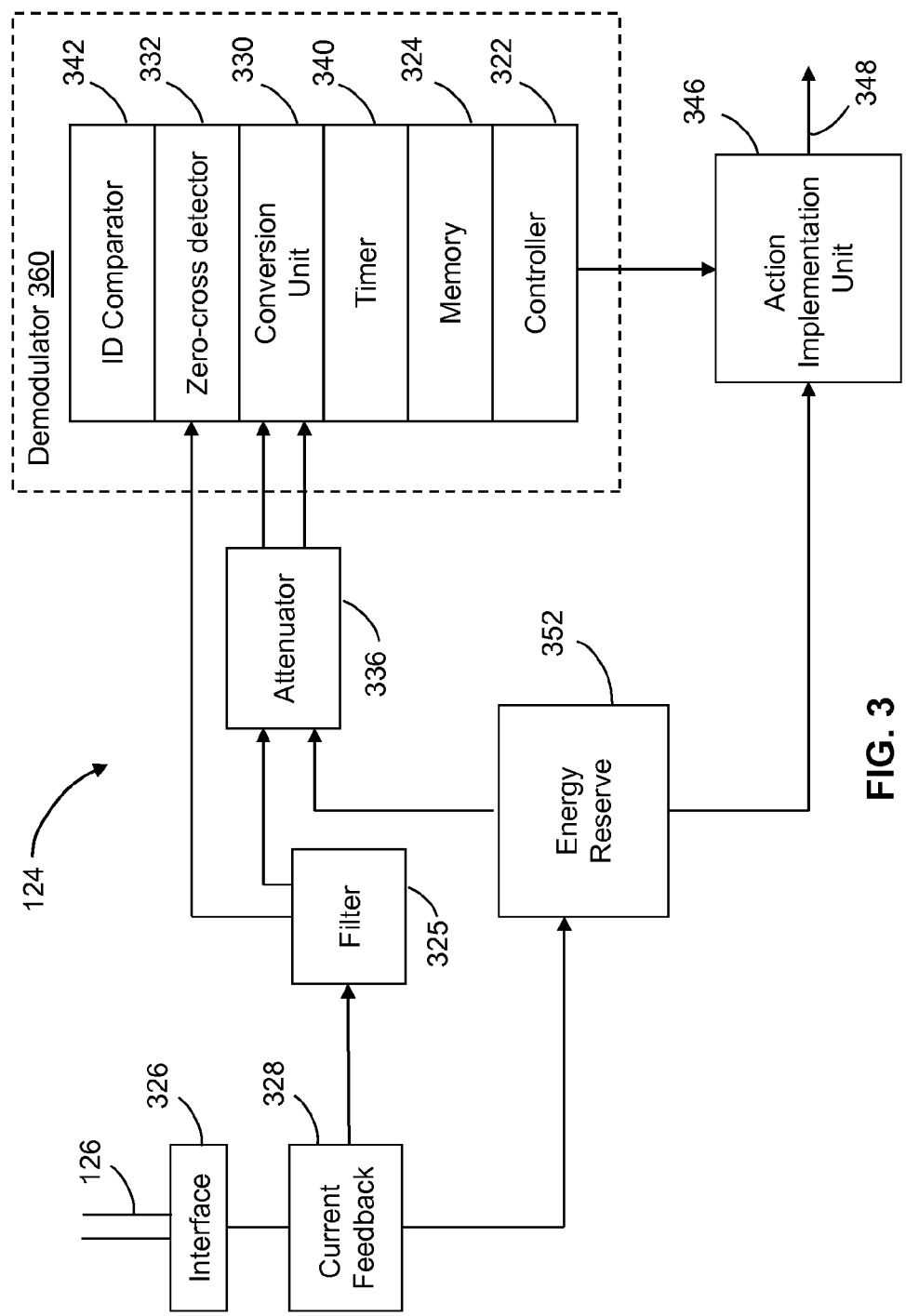
FIG. 3 depicts a simplified block diagram of an embodiment of an irrigation device that couples with and controls field stations and further couples with a two-wire interface to receive power as well as irrigation control instructions, parameters and/or other such communications.

FIG. 3 depicts a simplified block diagram of an embodiment of an irrigation device 124 that couples with and controls field stations 130 and further couples with a two-wire interface 126 to receive power as well as irrigation control instructions, parameters and/or other such communications. Numerous irrigation devices 124 can be coupled with a single two-wire interface 126. The irrigation device 124 includes a multi-wire interface 326, a current feedback 328, a filter 325, an attenuator 336, an energy reserve 352, one or more action implementation units 346 and a demodulator 360. In the illustrated embodiment, the demodulator 360 includes a controller 322, one or more memory 324, an Analog to Digital conversion unit 330, a zero-cross detector 332, one or more timers 340, and a device ID comparator 342. The one or more action implementation units 346 can implement actions with output 348 according to the data communications received over the two-wire interface; thus, the action implementation unit may be an irrigation activation unit, an irrigation halting unit and/or other such units. The components of the irrigation device can be coupled through one or more direct connections, busses and/or other relevant coupling. The energy reserve 352 and/or other back up power provides power to allow the irrigation device 124 to turn on/off irrigation or initiate/terminate irrigation according to locally stored irrigation scheduling should power over the two-wire interface be interrupted. Power from the two-wire interface can, in some instances, be used to store power in the energy reserve 352. The energy reserve 352 may include one or both of a battery and capacitor. In preferred form, the one or more energy reserves 352 rectifies the incoming sinusoidal waveform and includes one or more capacitors that are charged by power received from the two wire interface 126, and discharged to provides bursts of energy to latch and unlatch one or more latching solenoid controlled irrigation valves. In some embodiments, the energy reserve 352 stores power to provide DC power to the demodulator 360 and other components of the device 124. The energy storage 352 can provide power in the event of disruption of power from the two wire interface 126.

The irrigation device 124 can be implemented through hardware, software or a combination of hardware and software. In some implementations one or more components of the irrigation device are implemented through a single microprocessor, integrated circuit, microcontroller or other device. Additionally or alternatively, one or more of the components of the irrigation device can be integrated with the controller 322. For example, some or all of the memory 324, the zero-cross detector 332, the conversion unit 330, the timer 340, ID comparator 342, one or more of the action implementation units 346 and/or other components could be implemented in whole or in part through the controller 322. The irrigation device 124, can in some implementations, include a demodulator 360 that comprises one or more components for use in demodulating the received input signal, such as the controller 322, the memory 324, the conversion unit 330, the zero-cross detector 332, the ID comparator 342 and/or one or more timers 340. In some embodiments, many of the components of the irrigation device 124 are implemented through a microcontroller, such as one of the series of PIC16F677, 687, 689 manufactured by Microchip Technology, Inc. of Chandler, Ariz. or other similar controller.

The controller 322 can be implemented through one or more processors, microprocessors, microcontrollers, state machines or other such relevant controllers or combinations of controllers that provide overall functionality, data processing, and control over the irrigation device 124. The one or more memory 324 can store software programs, executables, data, irrigation control programming, scheduling, runtime parameters, soil conditions and parameters, other relevant programs and data, and instructions executable by a processor, machine or computer. The memory can be implemented through ROM, RAM, EEPROM, volatile disk drives, flash memory, removable medium (e.g., floppy disc, hard disc, compact disc (CD), digital versatile disc (DVD), flash memory, and the like), and substantially any other relevant memory or combinations of memory. Generically, the memory 324 may also be referred to as a computer readable medium.

As introduced above, the controller and/or other components of the irrigation device 124 can be implemented by software stored in memory and executed on a microcontroller or processor, or otherwise stored and executed in firmware. Further, the controller and/or other components can be implemented through logic devices, hardware, firmware and/or combinations thereof. Thus, the processing described herein may be performed using substantially any relevant processor logic or logic circuitry.

The modulated alternating signal (e.g., signals 400, 500 and 600 of FIGS. 4, 5 and 6) is received at the interface 126 from the two wire interface 126. In one embodiment, the interface 126 is simply a physical connection point, connector or coupler for electrically and mechanically coupling the multi wire interface 126 to the irrigation device 124. In normal operation, the received alternating signal passes through the current feedback 328 and is filtered by the filter 325, attenuated by the attenuator 336, and converted by the conversion unit 330. The attenuator 336 attenuates the signal generating a data signal (VDATAF) that is at a level that is more readily utilized by the irrigation device 124. For example, in some instances, the voltage is attenuated to a level that can be utilized in integrated circuits, such as about 5V or less. Further in some embodiments, the conversion unit 330 identifies or extracts an input signal reference voltage (VR-EFF) as a reference level and/or bias level in further processing the input signal.

Figure 5:
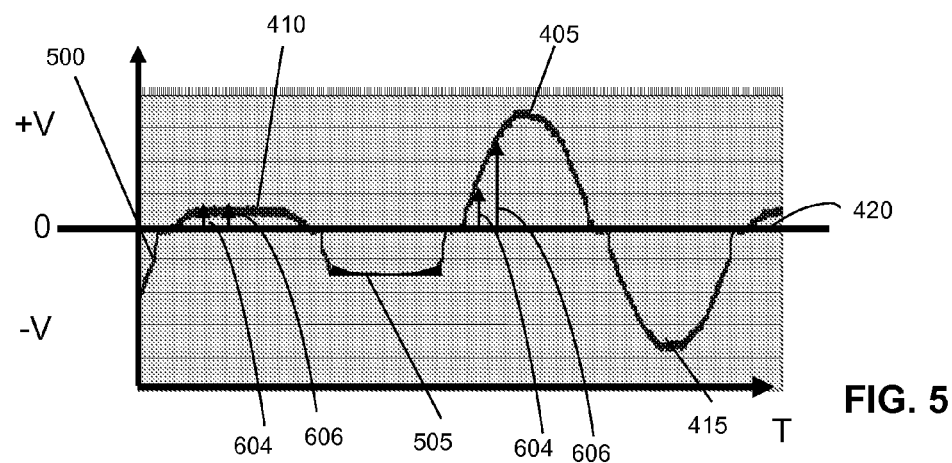
FIG. 5 depicts a simplified graphical representation of voltage over time of another alternating input signal that is received by the irrigation device according to another embodiment.
Figure 6:
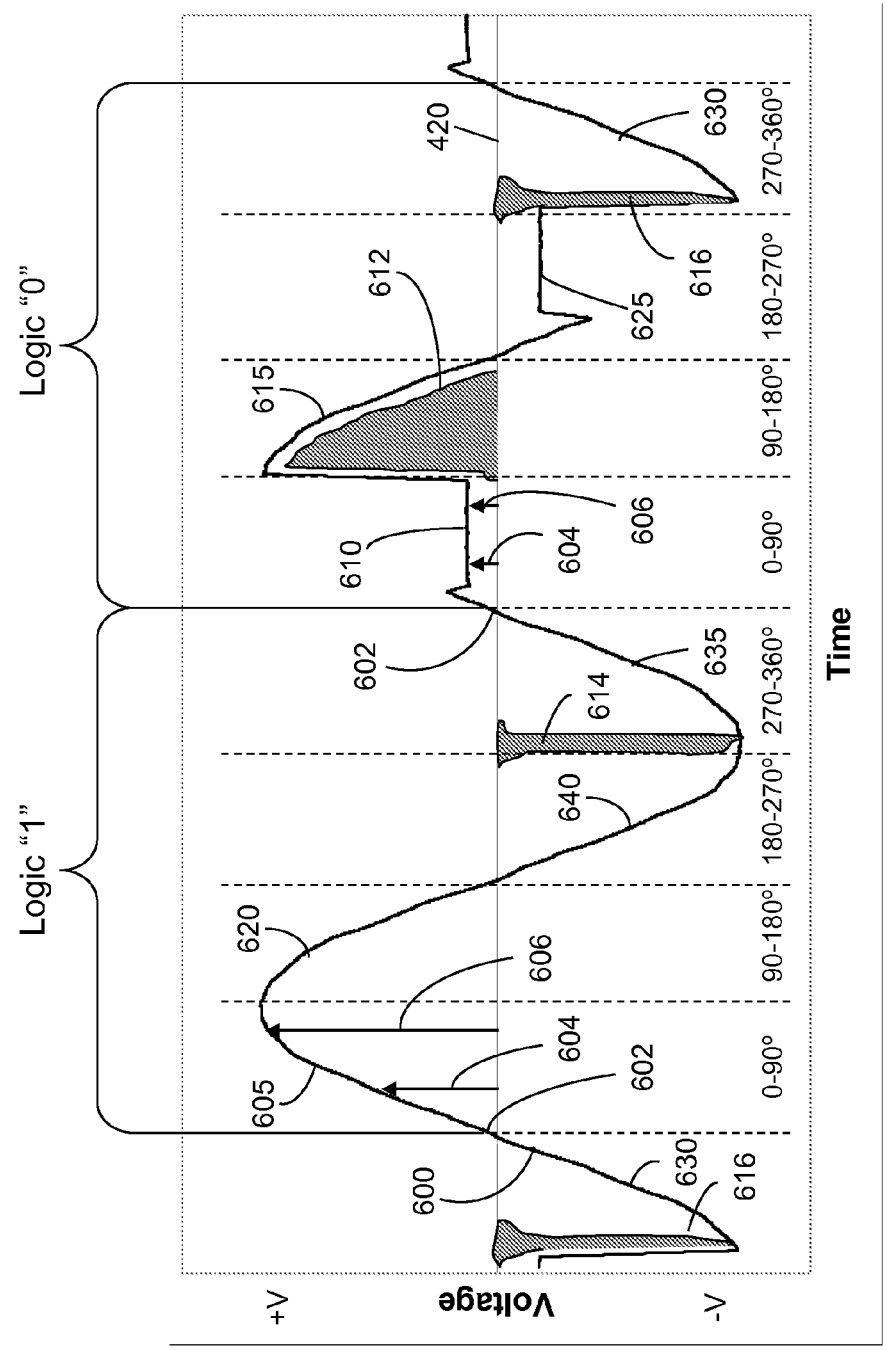
FIG. 6 depicts a simplified graphical representation of voltage over time of yet another alternating input signal that is received by the irrigation device according to a further embodiment.

The zero-cross detector 332 monitors input 326 and informs the controller 322 when a positive going voltage has crossed from negative to positive (e.g., see points 602 of FIG. 6). The timer 340 indicates a desired delay after the zero crossing and the controller 322 uses the analog to digital conversion unit 330 to measure the voltage level (see measurements 604 of FIGS. 4, 5 and 6 at a given delay after the zero crossing). In one embodiment, the controller 322 compares this measured voltage to a threshold voltage level set in the memory 324. In another embodiment, the controller 322 compares the measured voltage to another voltage measurement from a non-clipped portion of the waveform (e.g., portion 620). In some embodiments, the controller 322 makes both comparisons. Multiple voltage comparisons add accuracy by eliminating measurement errors caused by noise. In another embodiment, the controller 322 compares consecutive voltage measurements (e.g., see measurements 604 and 606 of FIGS. 4, 5 and 6 at different time delays from the zero crossing) by subtracting and deriving a slope. In one embodiment, logic "1" waveforms will have a large positive slope and logic "0" waveforms will have a small positive to small negative slope. This slope comparison simplifies the ability to differentiate logic "1" from logic "0". It is noted that while FIG. 6 illustrates two consecutive measurements 604 and 606, it is understood that there may be more than two consecutive measurements.

Slope differences are used to demodulate and identify data bits modulated on the signal, and in some embodiments, can further activate or awaken at least a portion of the irrigation device 124 from a dormant or sleep state that significantly reduces power consumption as further described below. The timer 340, in some embodiments, is utilized in cooperation with the controller 322 to identify data bits and/or synchronization based on one or more time thresholds, for example, time since a detection of a data bit. The timer can also further activate or awaken at least a portion of the irrigation device 124 from a dormant or sleep state that significantly reduces power consumption.

The ID comparator 342 extracts data from the received bits to determine whether the communication modulated on the input signal is directed to the irrigation device 124 and/or identifies parameters, instructions and/or requests. The irrigation activation units 346 can implement one or more instructions, such as activating one or more field stations 130, adjust parameters and/or implement other operations.

The current feedback 328 is discussed further below.

Figure 4:
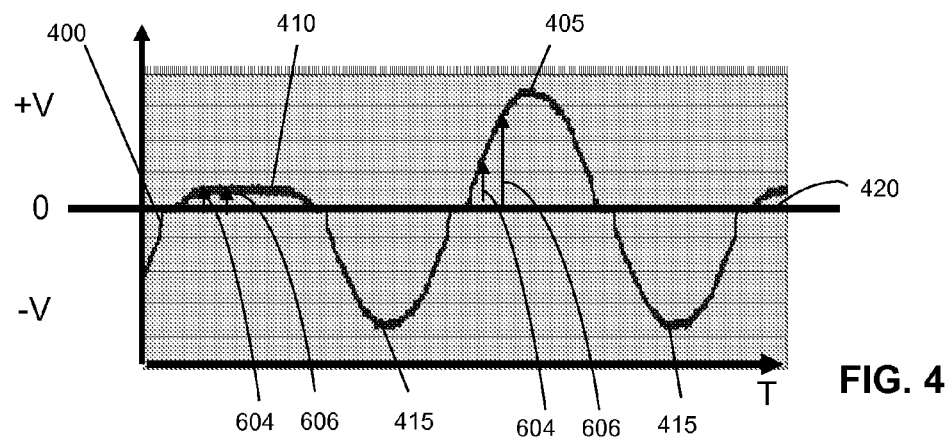
FIG. 4 depicts a simplified graphical representation of voltage over time of an alternating input signal that is received by an irrigation device according to one embodiment.

FIG. 4 depicts a simplified graphical representation of voltage over time of an alternating input signal 400 that is received by irrigation device 124 according to one embodiment. An alternating input signal or alternating power signal refers to an alternating voltage signal that provides power and alternates, for example, between positive and negative polarity. In an embodiment, the high side of each cycle of input signal 400 generally relates to communications, while the low side of each cycle generally relates to power management. In the illustrated embodiment, the signal 400 is a sinusoidal alternating input signal.

Information and/or data is modulated onto input signal 400 and can be identified and/or extracted by demodulator 360 of the irrigation device. As an example, the input signal can be a 50 or 60 Hz sinusoidal waveform. One or more of the high and/or low peaks can be distorted (e.g., clipped or truncated) to indicate bits of information and/or synchronization indication, for example. In some embodiments, one or more high or positive peaks can be identified as data peaks that are unclipped 405 or clipped 410 to indicate logic bits (e.g., logic ones and zeros, respectively). In the illustrated embodiment, the signal 400 is either amplitude clipped or not during the 0-180 degree portion of each cycle of the alternating signal 400 to communicate a logic 0 or 1.

Input signal 400 is also shown having multiple negative or low peaks 415 occurring within the low side of each cycle. These portions of the input signal are typically used for, among other uses, powering (e.g., charging an energy reserve) of the population of irrigation devices 124. FIG. 4 also shows a central or signal input reference voltage level VREFF 420, which may be defined using, for example, conversion unit 330.

In some cases it is desirable for irrigation device 124 to provide feedback to the entity providing input signal 400 (e.g., irrigation controller 122). For example, it is common for the irrigation devices to acknowledge that they received and executed commands and instructions provided by the irrigation controller. This feedback may occur by the irrigation device shunting the power line (two wire interface 126) through a resistor used to receive input signal 400, which provides current feedback to the irrigation control system. That is, the shunting or shorting of the power lines causes a current draw (voltage drop) that is detected by controller 122 or other device containing the modulator 134. In the embodiment of FIG. 3, the current feedback 328 provides the shunting as directed by the controller 322. In one embodiment, the current feedback 328 includes a switch (for example, an electronic switch, such as a triac) and resistor (not shown), the switch selectively coupling the two wires of the two wire interface 126 together through the resistor when directed by the controller 322.

Consider the scenario in which irrigation device 124 is to provide feedback relating to clipped signal 410, which again may represent a logic level zero data bit. Clipped signal 410 requires nearly an entire half cycle of the high side of the cycle. In this embodiment, because of the relatively low voltage of clipped signal 410, irrigation controller 122 is typically unable to receive feedback from irrigation device 124 during this half cycle, and thus must wait until a later clock cycle to receive such feedback. In one embodiment, the current feedback is provided during an unclipped portion of the waveform.

FIG. 5 depicts a simplified graphical representation of voltage over time of alternating input signal 500 that is received by irrigation device 124 according to another embodiment. Input signal 500 is similar in many respects to input signal 400 of FIG. 4.

One difference relates to the inclusion of clipped portion 505 of the signal, which is located on the low side of the cycle immediately following clipped portion 410 of the signal (for example, during the 90-180 degree portion of the alternating signal). One purpose for this arrangement is to provide a balanced waveform during transmission. For instance, if clipped portion 410 of the signal is provided, then an associated clipped portion 505 of the signal is also provided on the low side of the cycle. On the other hand, if a non-clipped portion of the signal is present on the high side, such as non-clipped portion 405, then a corresponding non-clipped portion 415 of the signal on the low side of the cycle will follow.

It is understood that over a given time frame, there may be a series of clipped and non-clipped portions of the signal, in any order, located on the high side of individual cycles. Consequently, during this given time frame, a balanced waveform is possible by having the shape (e.g., clipped or non-clipped) of the low side of an individual cycle effectively match the high side of the cycle. One benefit of implementing a balanced waveform, such as that depicted in FIG. 5, is that galvanic corrosion on the transmission medium (e.g., two-wire interface 126) is minimized or even eliminated.

In an embodiment, the low (e.g., negative) side of input signal 500 may be used to charge the population of irrigation devices 124. However, situations may arise in which the input signal includes a series of logical zeros (i.e., a number of cycles having clipped portions 410, 505). Since clipped portion 505 typically does not provide a significant amount of power, issues may arise as to whether the irrigation controllers are receiving suitable amounts of power.

FIG. 6 depicts a simplified graphical representation of voltage over time of an alternating input signal 600 that is received by irrigation device 124 according to a further embodiment. This embodiment is similar in some respects to the examples of FIGS. 4 and 5. For instance, the high side of each cycle of input signal 600 generally relates to communications, while the low side of each cycle generally relates to power management. In addition, information and/or data modulated onto input signal 600 is identified and/or extracted by demodulator 360 of the irrigation device.

FIG. 6 also includes one or more high or positive peaks that can be identified as data portions that are unclipped 605 or clipped 610 to indicate logic bits (e.g., logic ones and zeros, respectively). In this embodiment, less than the entire half cycle is utilized to represent a particular logic bit. For instance, clipped portion 610 is shown occurring during the leading quarter (i.e., 0-90 degrees) of a particular cycle. The following quarter (i.e., 90-180 degrees), which is still on the high side, includes a non-clipped portion 615 of the signal. Thus, a logic bit zero, for example, may be represented by clipped portion 610 of the signal, which is present in the leading quarter of the cycle.

Logic bit one may be achieved in a similar manner. Unclipped portion 605 of the signal is shown occurring in a leading quarter, followed by another non-clipped portion 620 of the signal in a following quarter. This arrangement is distinguishable from the clipped portions of FIGS. 4 and 5 which implement clipped signals using most, if not all, of an entire half-cycle. Accordingly, in the illustrated embodiment, the characteristics of the waveform during the first quarter of the waveform dictate whether or not a logic 1 or 0 is being communicated. It is noted that the clipping/non-clipping may occur within other portions of the waveform and is not limited to occurring within a given quarter of the waveform. That is, in some embodiments, the waveform is clipped/non-clipped for less than or more than a full quarter of the waveform. Additionally, the portion of the waveform designated for clipping may occur during a negative portion of the waveform. Additionally, it is noted that while the illustrated embodiment refers to clipping the waveform at a given portion, clipping is one example of otherwise distorting the waveform relative to an undistorted state during a designated portion of the waveform for communicating logic 1s and 0s. In this case, the distorted state corresponds to one of a one or zero and the undistorted state corresponds to the other of the one or zero.

One benefit of the FIG. 6 example is that the receiving device, such as irrigation device 124, can demodulate the data from the received signal more quickly, as compared to the examples of FIGS. 4 and 5. For instance, in some cases, it may generally take a longer amount of time to ascertain that an input signal has or has not been clipped when such clipping occurs on the basis of a half-cycle (e.g., FIGS. 4 and 5). However, in the FIG. 6 example, since clipping occurs in less than an entire half cycle (and in many cases less than a quarter cycle), the type of signal can be interpreted or otherwise identified more quickly (e.g., before the waveform reaches 90 degrees).

FIG. 6 also shows that the following quarter on the high side (i.e., 90-180 degrees, see portions 615 and 620) of a particular cycle can be transmitted at full or substantially full amplitude. That is, no-clipping is required on the quarter following the clipped portion 610. One benefit of this arrangement is that the amount of current feedback to irrigation controller 122 from irrigation device 124 can be maximized during the following quarter. An example of this is depicted by non-clipped portion 615, which follows clipped portion 610. This arrangement is useful to permit irrigation device 124 to provide feedback to irrigation controller 122, for example, during this following quarter. In this case, the irrigation controller 122 and the irrigation device 124 know that this portion of the signal (90-180 degrees) is intended to be unclipped and is designated for feedback from the irrigation device 124 to the irrigation controller 122. In the embodiment of FIG. 6, this feedback occurs during transmission of non-clipped portions 615 and 620. This arrangement permits both data (e.g., either of clipped or non-clipped signals 605, 610) and feedback (e.g., during either of non-clipped signals 620, 615) over a single half cycle.

As before, in one embodiment, the feedback occurs by the irrigation device shunting the power lines (e.g., two-wire interface 126) through a resistor, which provides current feedback (illustrated a current draw 612) to the irrigation controller during the second quarter of the signal. The presence of the current draw 612 is sensed by the irrigation controller 122 during the time of the second quarter of a logic 0 and is interpreted by the controller 122 as one of a logic one or zero. Additionally, the absence of the current draw 612 at the time of this feedback portion of the signal is interpreted by the controller 122 as the other of the logic one or zero. This feedback may occur more quickly, as compared to the examples of FIGS. 4 and 5, since the relevant portion of the signal (e.g., clipped portion 610, non-clipped portion 615) occurs over a relative shorter period of time (e.g., quarter cycle vs. half cycle). In general, this feedback may originate from any of the irrigation devices and may occur within a time period that generally corresponds with at least a portion of the time period relating to non-clipped portion 615, or at least a portion of the time period relating to non-clipped portion 620, and combinations thereof. It is noted that in the illustrated embodiment, the portion of the signal designated for communications (such as feedback) from the irrigation devices 124 to the irrigation controller 122 is the second quarter of the signal during a cycle with a clipped portion 610. It is noted that in other embodiments, other portions of a cycle of the signal may be designated for communications instead of or in addition to the second quarter of a cycle with a clipped portion 610. For example, in one embodiment, the second quarter of a cycle having the clipped portion 610 and the second quarter of a cycle having the non-clipped portion 605 may be designated for communications (e.g., feedback or generally to communicate data (such as sensor data) from the irrigation devices 124 to the irrigation controller 122). For example, in such cases, current is selectively drawn during one or both of portions 615 and 620 to communicate logic 1s and 0s to the irrigation controller 122. In further embodiments, more or less than a full quarter of a portion of a cycle of the signal may be designated for communications. For example, a given eighth (or other fraction) of the cycle could be designated for communications. In some embodiments, the portion of a cycle designated for communications is a non-clipped portion of the cycle.

As such, the irrigation controller may detect feedback from any of the irrigation devices within a time period that generally corresponds with at least a portion of the non-clipped portion 615. In an embodiment, the irrigation controller assigns a time period that generally corresponds to the non-clipped portion 615 to permit this feedback.

Similar to the example of FIG. 5, the low side of input signal 600 may be used to power (e.g., charge an energy reserve) of each of the population of irrigation devices 124. Concerns were previously noted that the input signal 400 may include a series of logical zeros, and thus, it was possible that the irrigation devices may not receive the necessary power. This matter is alleviated in this embodiment since the clipped portion of the low side does not exist for the entire half cycle (as it does in FIG. 5). Instead, whenever a logical zero is represented using clipped portion 610, for waveform balancing purposes, only the leading quarter of the low side of the cycle is clipped (e.g., clipped portion 625). The following quarter (270-360 degrees), denoted by non-clipped portion 630, is transmitted at effectively full amplitude. Illustrated as recharge currents 614 and 616 during the beginning of the unclipped portion, the irrigation device draws current to charge the energy reserve 352 or otherwise draw power to power one or more components of the irrigation device 124. The following quarter non-clipped portion 630 is generally sufficient to provide necessary power to the irrigation devices. As such, the irrigation devices are not power starved in the event that input signal 600 transmits a series of logical zeros.

This embodiment also implements a desirable balancing feature in which a balanced waveform is possible by having the shape (e.g., clipped or non-clipped) of the low side of an individual cycle effectively match the high side of the cycle. However, in contrast to other embodiments, the example of FIG. 6 uses balancing that is based upon each quarter of the waveform. For instance, if the leading quarter of the high side includes clipped portion 610, then the leading quarter (which is the third quarter of the cycle) of the low side similarly includes a clipped portion 625. If the leading quarter of the high side includes unclipped portion 605, then the leading quarter (which is the third quarter of the cycle) of the low side similarly includes an unclipped portion 640. Likewise, non-clipped portions 615, 620 on the high side have corresponding non-clipped portions 630, 635 on the low side of the cycle. Accordingly, the example of FIG. 6 also provides a balanced waveform which is helpful in minimizing or eliminating galvanic corrosion on the transmission medium.

Various embodiments have been described with regard the high side of each cycle of input signal 600 as generally relating to communications, while the low side of each cycle relates to power management. Alternatively, this arrangement can be reversed such that that the high side of the cycle relates to power management and the low side relates to communications.

Figure 7:
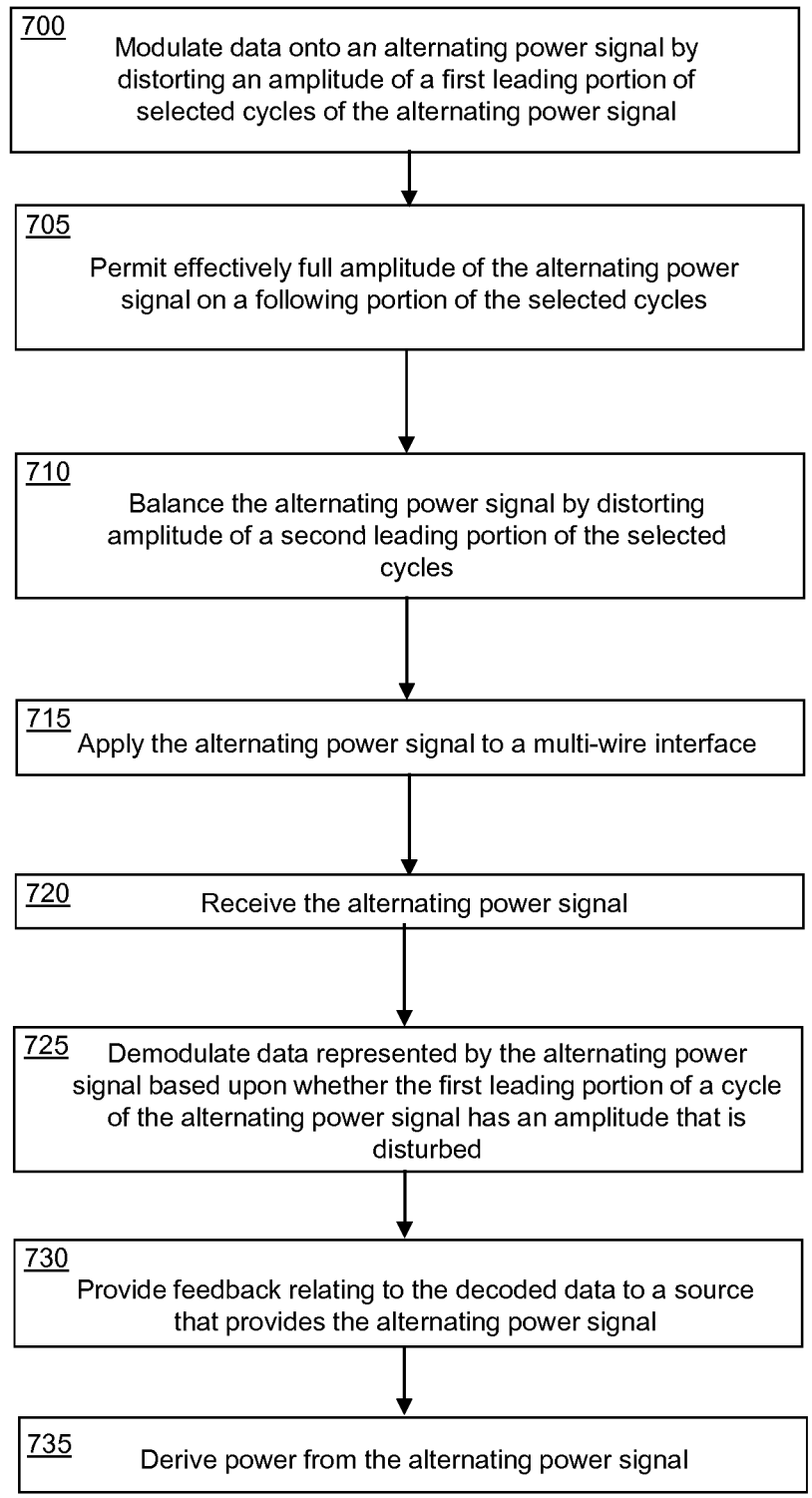
FIG. 7 is a flowchart depicting a method for controlling an irrigation device and for providing feedback in accordance with an embodiment of the present invention.

FIG. 7 is a flowchart depicting a method for controlling an irrigation device and for providing feedback in accordance with an embodiment of the present invention. This method will be described with occasional reference to the various components and features of FIGS. 1-6, but it is understood that the disclosed method is not limited to the depicted features. In general, blocks 700-715 relate to operations associated with an irrigation controller (controller 122 or other interface unit that couples the irrigation controller to a multi-wire interface), and blocks 720-735 relate to operations associated with an irrigation device (e.g., irrigation device 124).

Block 700 includes modulating data onto an alternating power signal, such as input signal 600, by distorting amplitude (e.g., clipping) of a first leading portion of selected cycles of the alternating power signal. An example of the first leading portion is clipped portion 610 of the signal (FIG. 6) occurring during the first quarter (0-90 degrees) of a cycle of the signal. In one embodiment, the cycle with the distorted amplitude corresponds to a logic zero.

Block 705 includes permitting effectively full amplitude of the alternating power signal on a following portion of the selected cycles. An example of this following portion is non-clipped portion 615 occurring during the second quarter (90-180 degrees) of the cycle. The non-clipped portion is effectively at full amplitude to the extent that the amplitude of this portion of the signal is not unduly distorted and has threshold amplitude which permits feedback communication with a coupled device, such as irrigation device 124. It is understood that a signal that has effectively full amplitude may also exhibit some degree of attenuation or other degradation while still permitting the desired feedback.

According to various embodiments, the first leading portion (e.g., clipped portion 610) and the following portion (e.g., non-clipped portion 615) are either both on a high side of a cycle or both on a low side of a cycle of an alternating power signal, such as signal 600. The example of FIG. 6 illustrates the first leading portion and the following portion as being located on the high side of the cycle.

Block 710 includes an optional feature of balancing the alternating power signal by distorting amplitude (e.g., clipping) of a second leading portion of the cycles selected in block 700. In an embodiment, the second leading portion is on an opposite cycle side as that of the first leading portion. For instance, the first leading portion may include clipped portion 610 and the second leading portion includes clipped portion 625. As such, the first leading portion is on the high side of the cycle and clipped portion 625 is on the low side of the cycle. Again, the side of the cycle at which these portions occur can be switched such that clipped portion 610 of the signal is on the low side and clipped portion 625 of the signal is on the high side of the cycle.

If desired, further operations include distorting amplitude of the second leading portion so that it effectively corresponds to both amplitude and duration of the first leading portion. An example of this is shown in FIG. 6 in which the amplitude and duration of clipped portion 610 effectively corresponds to the amplitude and duration of clipped portion 625. This arrangement facilitates, among other things, the balancing of the alternating power signal.

Block 715 recites applying the alternating power signal to a multi-wire interface, such as interface 126.

Block 720 includes receiving the alternating power signal, which typically includes cycles having a first leading portion and a following portion. The alternating power signal is typically received by one or more irrigation devices 124 via the interface 126. As noted above, in some embodiments, the first leading portion and the following portion are either both on a high side of a cycle or both on a low side of a cycle of the alternating power signal.

Block 725 recites demodulating data represented by the alternating power signal (e.g., a logic 1 or 0) based upon whether the first leading portion of a cycle of the alternating power signal has an amplitude that is distorted. For example, clipped portion 610 is an example which may be demodulated as a logical 0 whereas unclipped portion 605 is demodulated as a logic 1. The data may be demodulated in numerous ways. For example, as discussed above with reference to FIG. 3, when the first leading portion of the waveform begins, the voltage of the input signal is monitored. If the voltage reaches a threshold, the first leading portion is unclipped and is demodulated as a logic 1, whereas if the threshold is not reached during the time corresponding to the first leading portion, then the first leading portion is demodulated as a logic 0. In another embodiment, the voltage measurement of the signal is compared to another voltage measurement of a non-clipped portion of the waveform. If it matches, it is demodulated as a logic 1 and if it does not, it assumes the signal is a clipped and demodulates it as a logic 0. In some embodiments, the demodulator uses both the threshold comparison and the unclipped signal comparison. In another embodiment, multiple consecutive voltage measurements are compared by subtracting and deriving a slope based on the consecutive measurements. In one embodiment, logic "1" waveforms will have a large positive slope and logic "0" waveforms will have a small positive to small negative slope.

Block 730 recites providing feedback relating to the data to a source providing the alternating power signal during the following portion of a cycle of the alternating power signal. In other words, the data is communicated to the source during the following portion of the cycle of the alternating power signal. In various embodiments, the source may be implemented using controller 122. Non-clipped portions 615 and 620 are examples of a following portion of an alternating power signal that are designated for feedback or otherwise designated for communications from the irrigation device 124 upstream to the irrigation controller 122. Each occurrence of the portion 615, 620 provides an opportunity for the irrigation device 124 to communicate a logic 1 or 0. That is, as described above, under control of the controller 322, the power lines of the two-wire interface are selectively shunted through a resistor to cause a current draw 612 or not. The irrigation controller 122 detects the communications represented by the feedback. The presence of the current draw 612 as detected by the irrigation device 122 is demodulated as one of a logic 1 or 0, whereas the absence of the current draw 612 during the timeframe of the portion 615, 620 is demodulated by the irrigation controller 122 as the other of a logic 1 or 0.

The feedback or upstream communication may occur during a following portion of a cycle which consecutively follows the first leading portion. For instance, in FIG. 6, feedback relating to clipped portion 610 may be provided during the time period that non-clipped portion 615 occurs. Non-clipped portion 615 consecutively follows clipped portion 610. Alternatively, the feedback may occur during a following portion of a cycle that does not consecutively follow the first leading portion. In this case, feedback occurring during non-clipped signal 615 would relate to data associated with a leading portion of a cycle that was previously received by demodulator 360 of the irrigation device. It is noted that in some embodiments, one or more portions of a cycle of the signal may be designated for communications. For example, in one embodiment, the second quarter of a cycle having the clipped portion 610 and/or the second quarter of a cycle having the non-clipped portion 605 may be designated for communications (e.g., feedback or generally to communicate data (such as sensor data) from the irrigation devices 124 to the irrigation controller 122). For example, in such cases, current is selectively drawn during one or both of portions 615 and 620 to communicate logic 1s and 0s to the irrigation controller 122. In further embodiments, more or less than a full quarter of a portion of a cycle of the signal may be designated for communications. For example, a given eighth (or other fraction) of the cycle could be designated for communications. In some embodiments, the portion of a cycle designated for communications is a non-clipped portion of the cycle.

In one embodiment, the feedback or upstream communication may be a simple bit following the communication string indicating an acknowledgment (ACK) of a received command. In another embodiment, multi-bit ACKs are used to acknowledge receipt of a command and send back information such as: message received and current mode is "ON". In further embodiments, the upstream communication represents data such as an eight bit value (sent over 8 cycles) that represents the most recent line voltage measurement (e.g. command acknowledged and device is currently working at 29 Volts). In further embodiments, the upstream communication may be data to be transmitted to the irrigation controller, such as data received from a sensor device (e.g., a soil moisture sensor or flow sensor) coupled to the irrigation device 124.

Block 735 includes deriving power from the received alternating power signal to charge an energy reserve (e.g., energy reserve 352) associated with one of a plurality of irrigation devices 124. It is noted that the step of Block 735 may not necessarily be performed in this order. If desired, the power is derived from the alternating power signal from a side of the cycle that is opposite to a side of the cycle of the first leading portion and the following portion. The example of FIG. 6 shows that power may be derived with recharge current 614 and 616 from the lower cycle side of signal 600.

Figure 8:
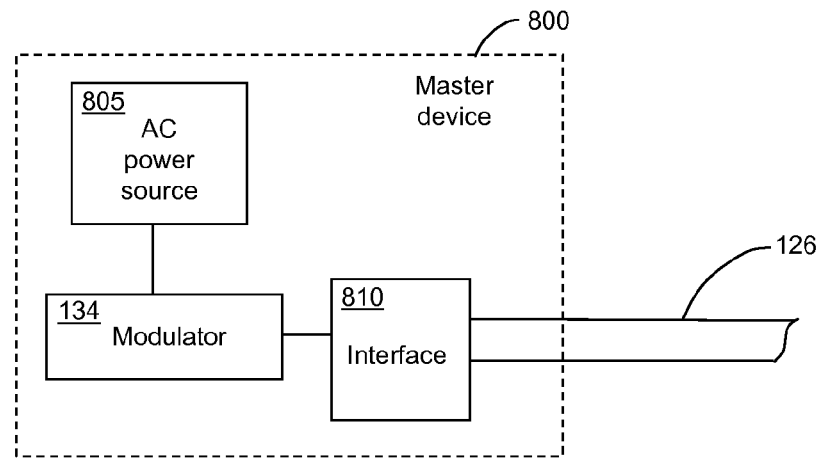
FIG. 8 is a block diagram showing in more detail several components of an irrigation controller.

FIG. 8 is a block diagram showing in more detail several components of a master device 800 (also referred to as an irrigation control device or source) that couples to the multi-wire interface 126 according to some embodiments. In some embodiments, the master device 800 is an irrigation controller in the sense that it generates watering schedules, and the master device 800 modulates the signaling to affect the watering schedules as sent to one or more irrigation devices 124. In other embodiments, the master device 800 is not an irrigation controller in that it does not generate watering schedules. In these embodiments, the master device 800 serves as an interface device for a separate irrigation controller (for example, a central irrigation controller 140) to the multi-wire interface 126. That is, the master device 800 serves as the transmitting device for providing power and data to the multi-wire interface 126. In all of these embodiments, master device 800 includes the modulator 134 coupled to AC power source 805 and an interface 810. The modulator 134 is typically configured to modulate data onto an alternating power signal provided by the AC power source. This modulating may be achieved by selectively distorting amplitude of a first leading portion of selected cycles of the alternating power signal. The modulating further permits effectively a full amplitude of the alternating power signal on a following portion of the selected cycles. As described in more detail with regard to the embodiment of FIG. 6, the first leading portion and the following portion are either both on a high side of a cycle or both on a low side of a cycle of the alternating power signal.

The interface 810 is an electrical and mechanical connection typically used to couple modulator 134 to a multi-wire interface, such as interface 126. As depicted in FIG. 1, interface 126 permits the alternating power signal to be delivered to a plurality of irrigation devices 124.

Figure 9:
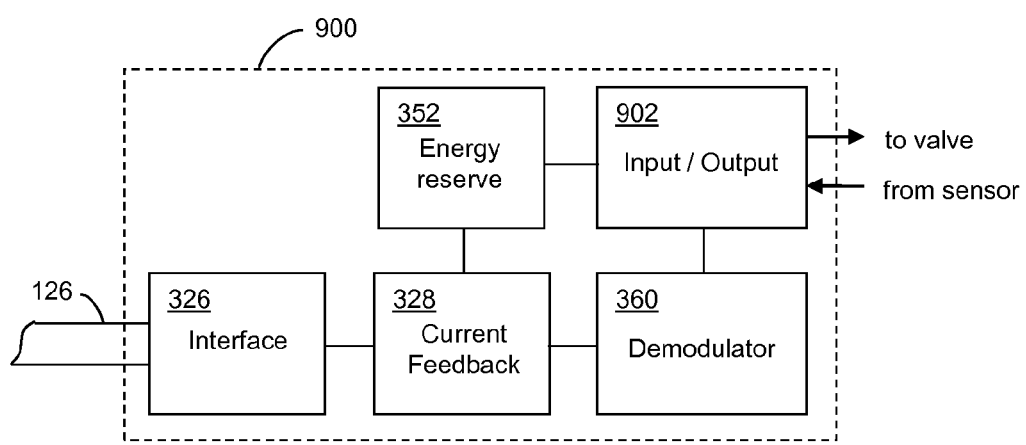
FIG. 9 is a block diagram of another embodiment of an irrigation device in accordance with a further embodiment.

Referring next to FIG. 9, a block diagram is shown of another embodiment of an irrigation device 900 in accordance with a further embodiment. The irrigation device 900 includes the interface 326, the current feedback 328, the demodulator 360, the energy reserve 352 and input/output 902. The components of the irrigation device 900 are similar to those described in FIG. 3. Additionally, the input/output 902 functions and one or both of an output and an input. As an output, the irrigation device outputs control signals to irrigation equipment to control water flow. For example, the output signals are provide to latch or unlatch a latching solenoid to open or close an irrigation valve controlled by the latching solenoid. When used as an input, for example, one or more sensor devices (soil moisture sensors, flow sensors, etc.) are coupled to the input/output 902. The signals and/or measurements from the sensors are passed to the controller of the demodulator 360. Data to be transmitted upstream to the master device 800 is communicated, for example, through the selective shunting of the two-wire interface 126 by the current feedback 328 under control of the demodulator 360.

Figure 10:
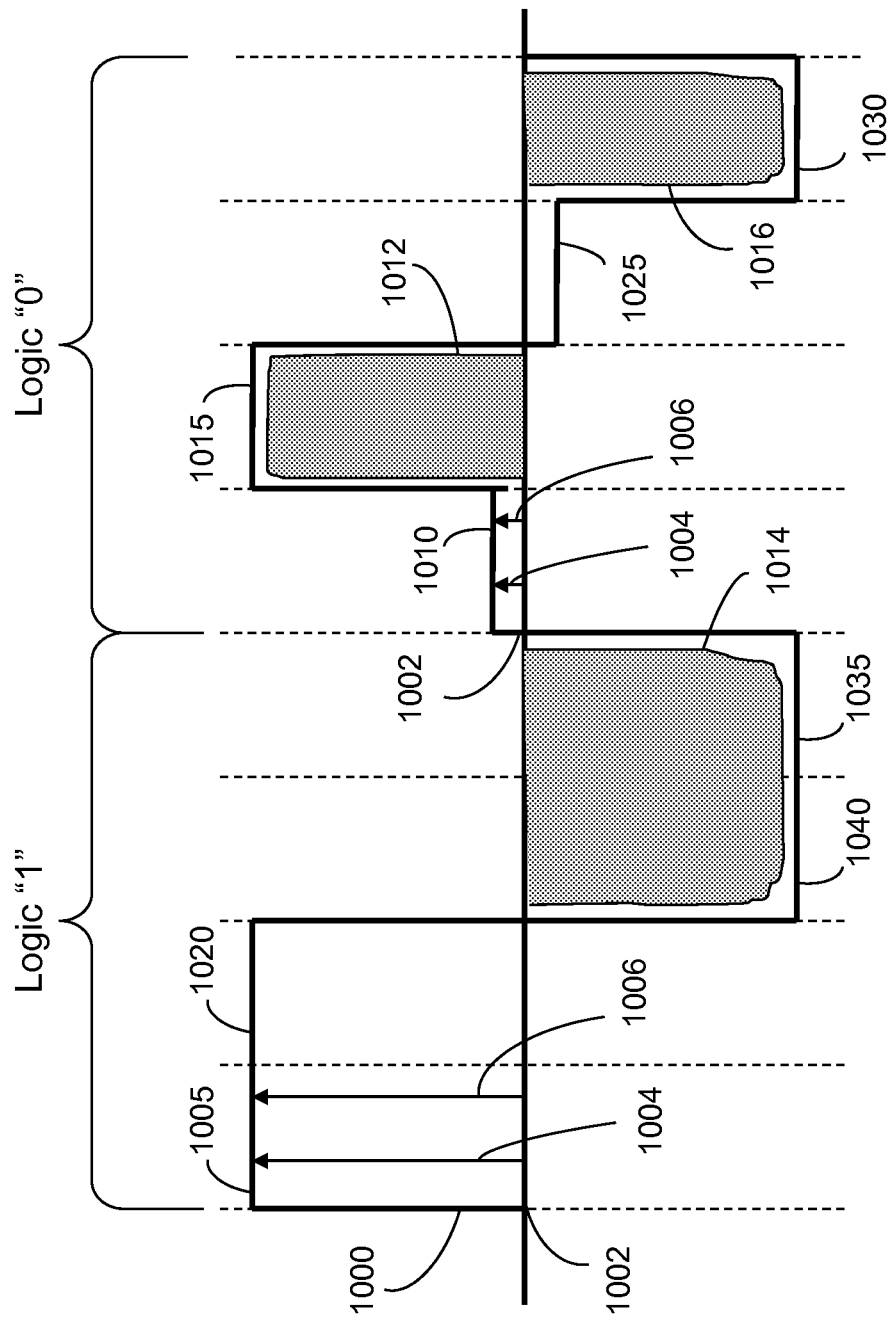
FIG. 10 depicts a variation of the graphical representation of FIG. 6 in the form of a square wave alternating signal in accordance with one embodiment.

Referring next to FIG. 10, a variation of the graphical representation of FIG. 6 is illustrated in the form of a square wave alternating signal in accordance with one embodiment. This embodiment is similar in some respects to the examples of FIG. 6, the main difference being that the waveform is an alternating square waveform. The high side of each cycle of input signal 1000 generally relates to communications, while the low side of each cycle generally relates to power management. In addition, information and/or data modulated onto input signal 1000 is identified and/or extracted by demodulator 360 of the irrigation device.

FIG. 10 also includes one or more high or positive portions that can be unclipped 1005 or clipped 1010 to indicate logic bits (e.g., logic ones and zeros, respectively). In this embodiment, less than the entire half cycle is utilized to represent a particular logic bit. For instance, clipped portion 1010 is shown occurring during the leading quarter (i.e., 0-90 degrees) of a particular cycle. The following quarter (i.e., 90-180 degrees), which is still on the high side, includes a non-clipped portion 1015 of the signal. Thus, a logic bit zero, for example, may be represented by clipped portion 1010 of the signal, which is present in the leading quarter of the cycle.

Logic bit one may be achieved in a similar manner. Unclipped portion 1005 of the signal is shown occurring in a leading quarter, followed by another unclipped portion 1020 of the signal in a following quarter. Accordingly, in the illustrated embodiment, the characteristics of the waveform during the first quarter of the waveform dictate whether or not a logic 1 or 0 is being communicated. It is noted that the clipping/non-clipping may occur within other portions of the waveform and is not limited to occurring within a given quarter of the waveform. That is, in some embodiments, the waveform is clipped/non-clipped for less than or more than a full quarter of the waveform. Additionally, the portion of the waveform designated for clipping may occur during a negative portion of the waveform. Additionally, it is noted that while the illustrated embodiment refers to clipping the waveform at a given portion, clipping is one example of otherwise distorting the waveform relative to an undistorted state during a designated portion of the waveform for communicating logic 1s and 0s. In this case, the distorted state corresponds to one of a one or zero and the undistorted state corresponds to the other of the one or zero.

The irrigation device 124 can demodulate the data from the received signal more quickly, as compared to the examples of FIGS. 4 and 5. In the FIG. 10 example, since clipping occurs in less than an entire half cycle (and in many cases less than a quarter cycle), the type of signal can be interpreted or otherwise identified more quickly (e.g., before the waveform reaches 90 degrees).

Like FIG. 6, FIG. 10 also shows that the following quarter on the high side (i.e., 90-180 degrees, see portions 1015 and 1020) of a particular cycle can be transmitted at full or substantially full amplitude. One benefit of this arrangement is that the amount of current feedback to irrigation controller 122 from irrigation device 124 can be maximized during the following quarter. For example, the irrigation controller 122 and the irrigation device 124 know that this portion of the signal (90-180 degrees) is intended to be unclipped and is designated for feedback from the irrigation device 124 to the irrigation controller 122. In the embodiment of FIG. 10, this feedback occurs during transmission of non-clipped portions 1015 and 1020. This arrangement permits both data and feedback over a single half cycle.

As before, in one embodiment, the feedback occurs by the irrigation device shunting the power lines (e.g., two-wire interface 126) through a resistor, which provides current feedback (illustrated a current draw 1012) to the irrigation controller during the second quarter of the signal. The current draw 1012 functions similarly to that described in connection with FIG. 6. It is noted that in the illustrated embodiment, the portion of the signal designated for communications (such as feedback) from the irrigation devices 124 to the irrigation controller 122 is the second quarter of the signal during a cycle with a clipped portion 1010. It is noted that in other embodiments, other portions of a cycle of the signal may be designated for communications instead of or in addition to the second quarter of a cycle with a clipped portion 1010. For example, in one embodiment, the second quarter of a cycle having the clipped portion 1010 and the second quarter of a cycle having the non-clipped portion 1005 may be designated for communications (e.g., feedback or generally to communicate data (such as sensor data) from the irrigation devices 124 to the irrigation controller 122). For example, in such cases, current is selectively drawn during one or both of portions 1015 and 1020 to communicate logic 1s and 0s to the irrigation controller 122. In further embodiments, more or less than a full quarter of a portion of a cycle of the signal may be designated for communications. For example, a given eighth (or other fraction) of the cycle could be designated for communications. In some embodiments, the portion of a cycle designated for communications is a non-clipped portion of the cycle.

Similar to the example of FIG. 6, the low side of input signal 1000 may be used to power (e.g., charge an energy reserve) of each of the population of irrigation devices 124. Illustrated as recharge currents 1014 and 1016 during the beginning of the unclipped portion, the irrigation device draws current to charge the energy reserve 352 or otherwise draw power to power one or more components of the irrigation device 124. It is noted that in embodiments where the population of irrigation devices 124 draw current to recharge during these portions of the signal, the recharge currents 1014 and 1016 have rounded edges to reflect current draw from multiple irrigation devices 124. The following quarter non-clipped portion 1030 is generally sufficient to provide necessary power to the irrigation devices. As such, the irrigation devices are not power starved in the event that input signal 1000 transmits a series of logical zeros.

This embodiment also implements a desirable balancing feature in which a balanced waveform is possible by having the shape (e.g., clipped or non-clipped) of the low side of an individual cycle effectively match the high side of the cycle. Like FIG. 6, the example of FIG. 10 uses balancing that is based upon each quarter of the waveform. For instance, if the leading quarter of the high side includes clipped portion 1010, then the leading quarter (which is the third quarter of the cycle) of the low side similarly includes a clipped portion 1025. If the leading quarter of the high side includes unclipped portion 1005, then the leading quarter (which is the third quarter of the cycle) of the low side similarly includes an unclipped portion 1040. Likewise, non-clipped portions 1015, 1020 on the high side have corresponding non-clipped portions 1030, 1035 on the low side of the cycle. Accordingly, the example of FIG. 10 also provides a balanced waveform which is helpful in minimizing or eliminating galvanic corrosion on the transmission medium.

Various embodiments have been described with regard the high side of each cycle of input signal 1000 as generally relating to communications, while the low side of each cycle relates to power management. Alternatively, this arrangement can be reversed such that that the high side of the cycle relates to power management and the low side relates to communications.

Detection of logic 1s and 0s can be done in multiple ways. For example, similar to that described above, a zero-cross detector determines when a positive going voltage has crossed from negative to positive (e.g., see points 1002 of FIG. 10). A timer indicates a desired delay after the zero crossing and the controller uses the analog to digital conversion unit to measure the voltage level (see measurements 1004 of FIG. 10 at a given delay after the zero crossing). In one embodiment, the controller of the demodulator compares this measured voltage to a threshold voltage level set in the memory. In another embodiment, the controller compares the measured voltage to a non-clipped portion of the waveform (e.g., portion 1020). In some embodiments, the controller makes both comparisons. Multiple voltage comparisons add accuracy by eliminating measurement errors caused by noise. In another embodiment, the controller takes consecutive voltage measurements (e.g., see measurements 1004 and 1006 of FIG. 10 at different time delays from the zero crossing), both independently used to determine if the threshold has been exceeded. It is noted that the controller does not need to determine the slope since the slope should be the same whether the portion is clipped or non-clipped. In this case, the multiple voltage measurements act to reduce errors caused by noise. It is noted that while FIG. 10 illustrates two consecutive measurements 1004 and 1006, it is understood that there may be more than two consecutive measurements.

The detection process is used to demodulate and identify data bits modulated on the signal, and in some embodiments, can further activate or awaken at least a portion of the irrigation device 124 from a dormant or sleep state that significantly reduces power consumption as further described below. The timer, in some embodiments, is utilized in cooperation with the controller to identify data bits and/or synchronization based on one or more time thresholds, for example, time since a detection of a data bit. The timer can also further activate or awaken at least a portion of the irrigation device 124 from a dormant or sleep state that significantly reduces power consumption.

Although the foregoing embodiments may be implemented using the exemplary series of operations described herein, additional or fewer operations may be performed. Moreover, it is to be understood that the order of operations shown and described is merely exemplary and that no single order of operation is required. Various embodiments of the present invention have been described, but still further features may alternatively or additionally be implemented in accordance with alternative embodiments of the present invention. While the invention herein disclosed has been described by means of specific embodiments, examples and applications thereof, numerous modifications and variations could be made thereto by those skilled in the art without departing from the scope of the invention set forth in the claims.

What is claimed is:

1. A method for providing power and data to an irrigation device, the method comprising:
   modulating data onto an alternating power signal by distorting an amplitude of a first leading portion of selected cycles of the alternating power signal;
   permitting effectively a full amplitude of the alternating power signal on a following portion of the selected cycles, wherein the first leading portion and the following portion are either both on a high side of a cycle or both on a low side of a cycle of the alternating power signal; and
   applying the alternating power signal to a multi-wire interface configured to couple with a plurality of irrigation devices.

2. The method of claim 1 comprising:
   wherein the distorting of the amplitude of the first leading portion causes an attenuation of a majority of the amplitude of the first leading portion.

3. The method of claim 1, further comprising: selectively distorting an amplitude of the second leading portion so that it effectively corresponds to both amplitude and duration of the first leading portion.

4. The method of claim 1 further comprising: communicating to a source providing the alternating power signal during the following portion of a cycle of the alternating power signal.

5. The method of claim 4, wherein the communicating comprises: selectively shunting a power line used for the receiving of the alternating power signal through a resistor during the following portion of the cycle of the alternating power signal to provide current feedback to effect communications.

6. The method of claim 4, further comprising, deriving power from the alternating power signal to charge an energy reserve associated with each of a plurality of irrigation devices.

7. A method for providing power and data to an irrigation device, the method comprising:
   modulating data onto an alternating power signal by distorting an amplitude of a first leading portion of selected cycles of the alternating power signal;
   permitting effectively a full amplitude of the alternating power signal on a following portion of the selected cycles, wherein the first leading portion and the following portion are either both on a high side of a cycle or both on a low side of a cycle of the alternating power signal; and
   applying the alternating power signal to a multi-wire interface configured to couple with a plurality of irrigation devices;
   wherein the first leading portion and the following portion comprise a full half cycle of the alternating power signal.

8. The method of claim 7, further comprising: selectively distorting an amplitude of the second leading portion so that it effectively corresponds to both amplitude and duration of the first leading portion.

9. The method of claim 7 further comprising: communicating to a source providing the alternating power signal during the following portion of a cycle of the alternating power signal.

10. The method of claim 9, wherein the communicating comprises: selectively shunting a power line used for the receiving of the alternating power signal through a resistor during the following portion of the cycle of the alternating power signal to provide current feedback to effect communications.

11. The method of claim 9, further comprising, deriving power from the alternating power signal to charge an energy reserve associated with each of a plurality of irrigation devices.

12. A method for providing power and data to an irrigation device, the method comprising:
   modulating data onto an alternating power signal by distorting an amplitude of a first leading portion of selected cycles of the alternating power signal;
   permitting effectively a full amplitude of the alternating power signal on a following portion of the selected cycles, wherein the first leading portion and the following portion are either both on a high side of a cycle or both on a low side of a cycle of the alternating power signal; and
   applying the alternating power signal to a multi-wire interface configured to couple with a plurality of irrigation devices;
   wherein the data is defined by a presence of a distortion in the alternating power signal and not by a width of the distortion.

13. The method of claim 12, further comprising: selectively distorting an amplitude of the second leading portion so that it effectively corresponds to both amplitude and duration of the first leading portion.

14. The method of claim 12, further comprising: communicating to a source providing the alternating power signal during the following portion of a cycle of the alternating power signal.

15. The method of claim 14, wherein the communicating comprises: selectively shunting a power line used for the receiving of the alternating power signal through a resistor during the following portion of the cycle of the alternating power signal to provide current feedback to effect communications.

16. The method of claim 14, further comprising, deriving power from the alternating power signal to charge an energy reserve associated with each of a plurality of irrigation devices.

17. A method for providing power and data to an irrigation device, the method comprising:
   modulating data onto an alternating power signal by distorting an amplitude of a first leading portion of selected cycles of the alternating power signal;
   permitting effectively a full amplitude of the alternating power signal on a following portion of the selected cycles, wherein the first leading portion and the following portion are either both on a high side of a cycle or both on a low side of a cycle of the alternating power signal; and
   applying the alternating power signal to a multi-wire interface configured to couple with a plurality of irrigation devices;
   wherein each bit of the data is modulated upon a different cycle of the alternating power signal.

18. The method of claim 17, further comprising: communicating to a source providing the alternating power signal during the following portion of a cycle of the alternating power signal.

19. The method of claim 18, wherein the communicating comprises: selectively shunting a power line used for the receiving of the alternating power signal through a resistor during the following portion of the cycle of the alternating power signal to provide current feedback to effect communications.

20. The method of claim 18, further comprising, deriving power from the alternating power signal to charge an energy reserve associated with each of a plurality of irrigation devices.

* * * * *